(12) United States Patent
Döpfert et al.

(10) Patent No.: US 8,613,687 B2
(45) Date of Patent: Dec. 24, 2013

(54) PLANETARY GEARBOX HAVING NESTED PLANETARY GEAR STAGES

(75) Inventors: Hagen Döpfert, Lindau (DE);
Alexander Bucher, Constance (DE);
Peter Ziemer, Tettnang (DE); Ulrich Hantke, St. Ingbert (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 238 days.

(21) Appl. No.: 13/375,823

(22) PCT Filed: May 19, 2010

(86) PCT No.: PCT/EP2010/056909
§ 371 (c)(1),
(2), (4) Date: Dec. 14, 2011

(87) PCT Pub. No.: WO2010/139559
PCT Pub. Date: Dec. 9, 2010

(65) Prior Publication Data
US 2012/0083384 A1 Apr. 5, 2012

(30) Foreign Application Priority Data
Jun. 4, 2009 (DE) .......................... 10 2009 026 751

(51) Int. Cl.
*F16H 57/08* (2006.01)
(52) U.S. Cl.
USPC ............................................ 475/331; 475/903
(58) Field of Classification Search
USPC .......................................... 475/330, 331, 903
See application file for complete search history.

(56) References Cited

U.S. PATENT DOCUMENTS

| | | | |
|---|---|---|---|
| 3,939,736 A | 2/1976 | Morin | |
| 5,484,348 A * | 1/1996 | Brown et al. | 475/248 |
| 5,503,605 A | 4/1996 | Beim | |
| 5,509,865 A | 4/1996 | Hall, III | |
| 5,919,111 A * | 7/1999 | Park | 475/269 |
| 6,726,591 B2 * | 4/2004 | Maruyama et al. | 475/330 |
| 7,824,302 B2 * | 11/2010 | Diosi et al. | 475/277 |
| 8,545,364 B2 * | 10/2013 | Ziemer et al. | 475/331 |
| 2003/0232692 A1 | 12/2003 | Chen | |

FOREIGN PATENT DOCUMENTS

| | | |
|---|---|---|
| CA | 2 221 597 A1 | 5/1998 |
| DE | 196 48 124 A1 | 6/1998 |
| JP | 1-141256 A | 6/1989 |
| JP | 7-133848 A | 5/1995 |

* cited by examiner

*Primary Examiner* — Roger Pang
(74) *Attorney, Agent, or Firm* — Davis & Bujold, PLLC; Michael J. Bujold

(57) ABSTRACT

A planetary gearbox, for an automatic transmission of a motor vehicle, comprising two stages, each provided with a sun gear, a ring gear and interposed planetary gears. The ring gear of the first planetary stage also forms the sun gear of the second stage, and the planetary gears of both stages are guided by a common planet carrier, produced from a casting material, which accommodates the planetary gears of the first stage at an axial offset position to the planetary gears of the second stage. The planet carrier is designed as one-piece such that pockets are respectively disposed in the planet carrier for receiving the planetary gears of the first stage at an offset angle, in the circumferential direction, to the pockets for receiving the planetary gears of the second stage, so that it is possible to form the pockets during casting using slides.

9 Claims, 3 Drawing Sheets

PLANETARY GEARBOX HAVING NESTED PLANETARY GEAR STAGES

This application is a National Stage completion of PCT/EP2010/056909 filed May 19, 2010, which claims priority from German patent application serial no. 10 2009 026 751.4 filed Jun. 4, 2009.

FIELD OF THE INVENTION

The invention relates to a planetary gearbox for an automatic transmission of a motor vehicle, comprising two stages, each provided with a sun gear, a ring gear and interposed planetary gears, wherein the ring gear of the first planetary stage also forms the sun gear of the second stage, and the planetary gears of both stages are guided by a common planet carrier made of a cast material, which accommodates the planetary gears of the first stage at an axial offset to the planetary gears of the second stage.

BACKGROUND OF THE INVENTION

Automatic transmissions for motor vehicles having gearboxes comprising nested planetary gear stages are known, wherein the gearboxes' power can be transferred between one inner lying sun gear, two planetary stages and one outer lying ring gear. The planetary stages can be disposed offset to each other in the axial direction due to the tight construction space in this automatic transmission.

The document U.S. Pat. No. 5,503,605 A discloses such a planetary gearbox for an automatic transmission in which planetary gears of a first stage are engaged with an inner lying sun gear and with an inner gearing of a first ring gear. This ring gear of the first planetary gear stage has a further gearing at its outer circumference by means of which it is in effective engagement with planetary gears of a second planetary gear stage, which in turn mesh with an outer lying ring gear. The planetary gears of both planetary stages are disposed aligned behind one another in the radial direction guided by a common planet carrier, where the planetary gears of the first stage are disposed offset in the axial direction to the planetary gears of the second stage due to the prevailing conditions of the construction space. In addition, the planet carrier is composed of two individual pieces, each of which accommodate the planetary gears of a stage and are joined together in the area of the first planetary gear stage.

Furthermore, a planet carrier of a planetary gearbox can be produced by means of a primary shaping manufacturing process, as is generally known.

The two piece design of the planet carrier has the problem that the planet carrier must be joined together in an additional assembly step, which increases the expense, and reduces the load capacity of the carrier in this region. However, manufacturing such a planet carrier as one piece would make the production process much more difficult because the arrangement of the planetary gears forms an undercut. Therefore, it is necessary either to use an expensive casting procedure in which the undercut pockets of the first stage are formed using a melt-out core, or to machine cut the pockets after the casting. Both variants significantly increase the cost of production.

SUMMARY OF THE INVENTION

Therefore, the problem addressed by the current invention is to create a planetary gearbox having nested planetary stages for an automatic transmission, in which a planet carrier guiding the planetary gears is implemented as one piece, while at the same time reducing the production costs for producing this planet carrier.

The invention comprises the technical teaching that the planet carrier is implemented as one piece so that each of the pockets in the planet carrier for accommodating the planetary gears of the first stage are disposed at an angle offset in the circumferential direction to the pockets for accommodating the planetary gears of the second stage, so that it is possible to form the pockets during casting using slides. The pockets of each planetary gear can be demolded using radial slides due to this design of the relative offset of the planetary gears of the two stages to each other. Consequently, it is possible to manufacture the planet carrier of the planetary gearbox according to the invention using a conventional casting process and at low cost.

The offset angle is the angle enclosed between lines connecting adjacent receiving bores for bolts of the planetary gears with a center point of the planet carrier.

According to one embodiment of the invention, the offset angle lies in the range of 20° to 70°. Selecting an offset angle in this range between the respective pockets of the first and second stage has the advantage that a pocket of the first stage can be formed together with a pocket of the second planetary gear stage using a radial slide. As a result, the number of slides that are required during casting is reduced.

In a further development of the invention, every pocket can be formed by means of an individual slide. This advantageously results in each pocket being optimally shaped with respect to its contour and therefore, with respect to strength, and an optimal shape and smooth running of the planet carrier.

In one embodiment of the present invention, there are webs in the circumferential direction, in each case between the pockets for accommodating the planetary gears of the second stage and the openings for manufacturing the pockets of the first stage. This has the advantage that the stiffness of the planet carrier can be significantly increased by the formed webs in this region.

Correspondingly, in a further advantageous embodiment of the invention, the first and second stage comprise different numbers of planetary gears. As a result, each planetary stage can be individually adapted to the torques to be transmitted by selecting an appropriate number of planetary gears, whereby the number of planetary gears can be reduced, thereby reducing the production costs of the planetary gearbox.

The planet carrier is expediently designed as a high pressure die casting. This means that the planet carrier can be produced with greater precision.

BRIEF DESCRIPTION OF THE DRAWINGS

Additional measures improving the invention are represented in the following in more detail together with the description of preferred embodiments of the invention based on the figures.

They show.

DETAILED DESCRIPTION OF THE PREFERRED EMBODIMENTS

Figure 1:
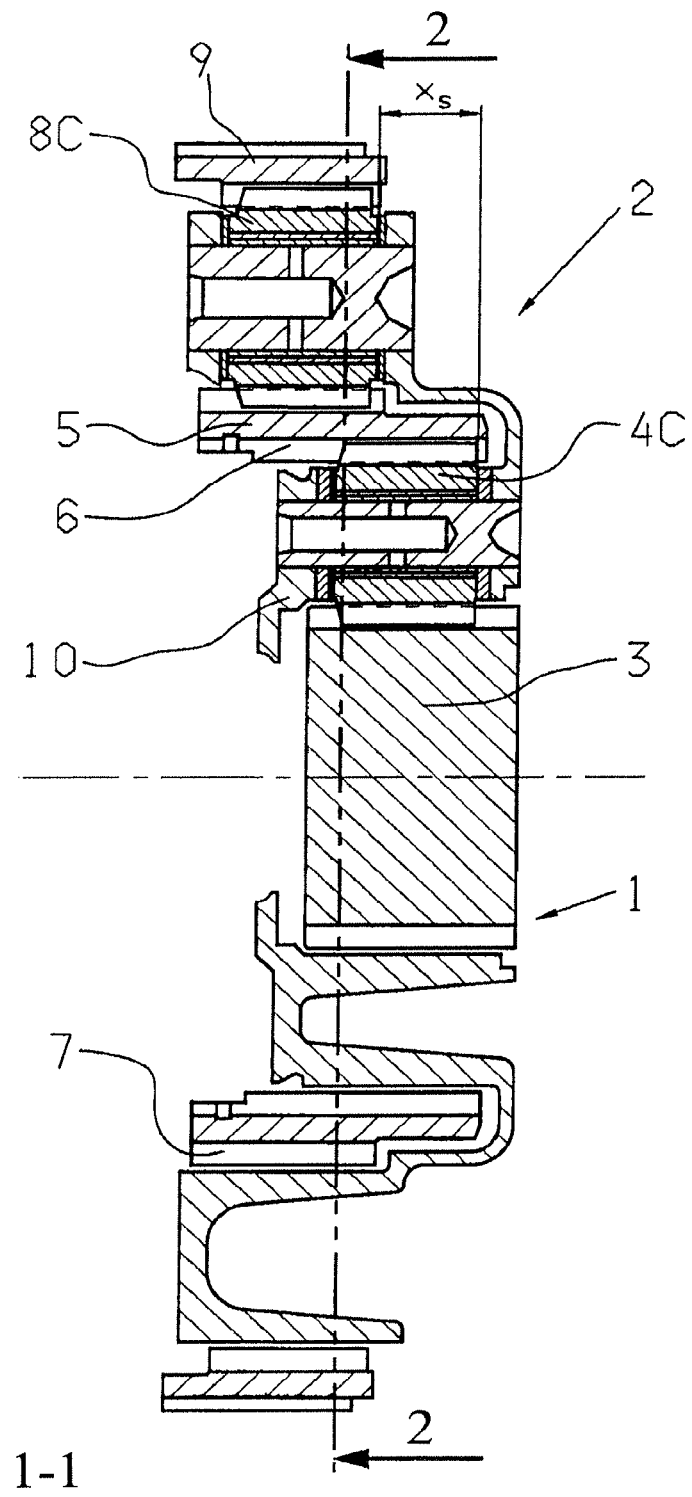
FIG. 1 a sectional representation of a planetary gearbox according to the invention according to a first embodiment, cut along the line 1-1 in FIG. 2.

FIG. 1 shows a sectional representation of a planetary gearbox according to the invention according to a first embodiment that is comprised of two nested stages 1 and 2. The first stage 1 comprises an inner lying sun gear 3 that is in effective engagement with a ring gear 5 via three planetary gears 4A-4C, of which only the planet gear 4C can be seen in this view due to the progression of the sectional cut. This ring gear 5, in addition to an inner gearing 6 for contacting the planetary gears 4A-4C of the first stage 1, comprises an outer gearing 7 on the outer circumference by means of which the ring gear 5 engages with three planetary gears 8A-8C of the second stage 2, and as a result forms the sun gear for the second stage 2. The planetary gears 8A-8C, in turn, are in effective engagement with an outer lying second ring gear 9. By using this nested design of the planetary gearbox in an automatic transmission of a motor vehicle in a manner known to a person skilled in the art, the desired rotational speed and torque is transmitted by selective actuation of clutch elements, not shown.

The planetary gears 4A-4C of the first stage 1 and the planetary gears 8A-8C of the second stage 2 are guided by a common planet carrier 10 that accommodates the planetary gears 4A-4C at an axial offset $x_S$ with respect to the planetary gears 8A-8C, in order to maintain a compact planetary gearbox, and thereby to enable a space saving installation in the space of an automatic transmission. In the process, the planet carrier 10 is implemented as a one piece high pressure die cast part, where the planetary gears 4A-4C and 8A-8C are each disposed offset to each other in the circumferential direction, in order to make demolding possible during the casting process using radial slides, despite the undercut in the area of the planetary gears 4A-4C due to the axial offset $x_S$.

Figure 2:
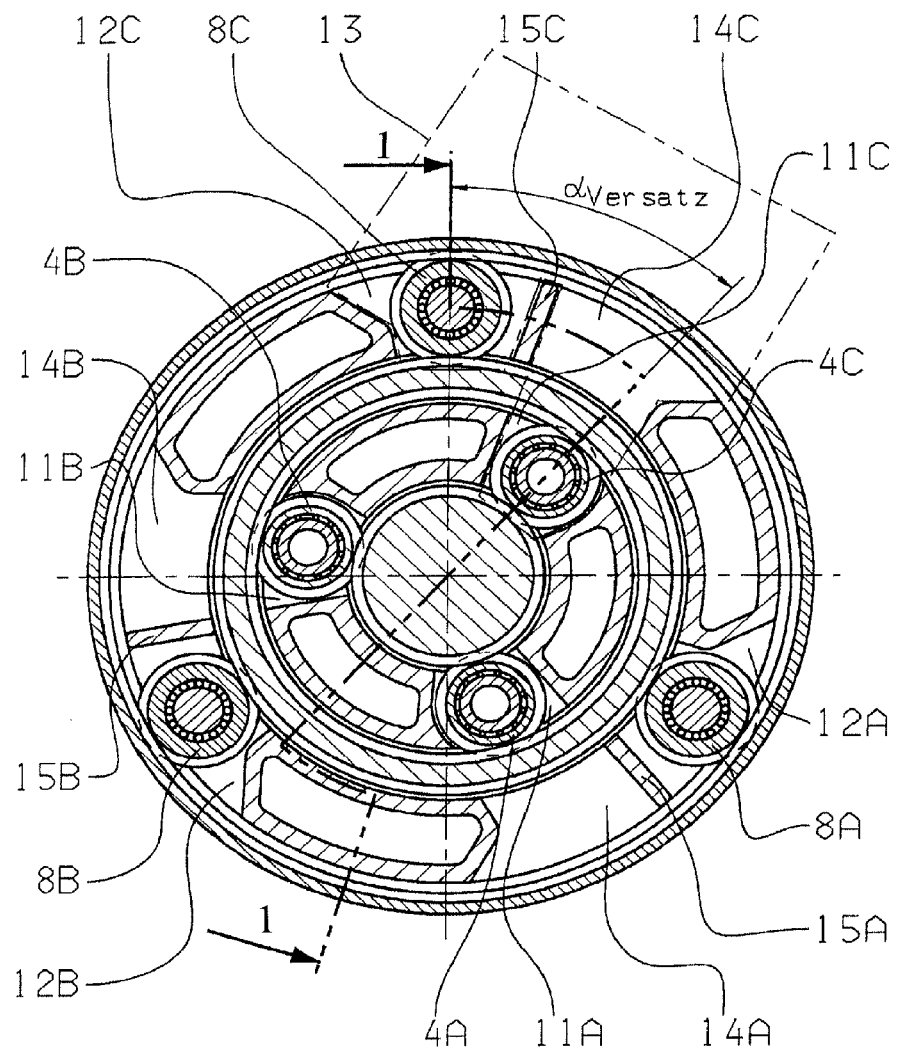
FIG. 2 a cross section of the planetary gearbox, cut along the line 2-2 in FIG. 1.

FIG. 2 shows a cross section of the planetary gearbox according to the invention from FIG. 1; here the offset in the circumferential direction between the planetary gears 4A-4C and 8A-8C is clearly indicated. As seen in the figure, pockets 11A to 11C, intended for accommodating the planetary gears 4A-4C of the first stage 1, are located in the radial inner region of the planet carrier 10, and are each disposed at an offset angle $\alpha_{Versatz}$ to pockets 12A to 12C that are disposed in the outer radial region of the planet carrier 10, and are intended for accommodating the planetary gears 8A-8C of the second stage 2. As a result of this offset angle $\alpha_{Versatz}$, it is possible to demold the pockets during the casting process using radial slides, despite the axial offset $x_S$ between the planetary gears 4A-4C and 8A-8C of the two stages 1 and 2. In the present case, the offset angle $\alpha_{Versatz}$ is selected to be small so that pockets 11A to 11C and the pockets 12A to 12C can each be demolded in pairs using a common radial slide, as is shown for example by the substitute contour 13 of a radial slide. In addition, this contour 13 is formed so that webs 15A to 15C are defined in each case between the pockets 12A to 12C for accommodating the planetary gears 8A-8C, and openings 14A to 14C that are built into the radial outer region of the planet carrier 10 during demolding for manufacturing pockets 11A to 11C. The strength of the planet carrier 10 can be significantly increased in this area by means of these webs 15A to 15C.

Figure 3:
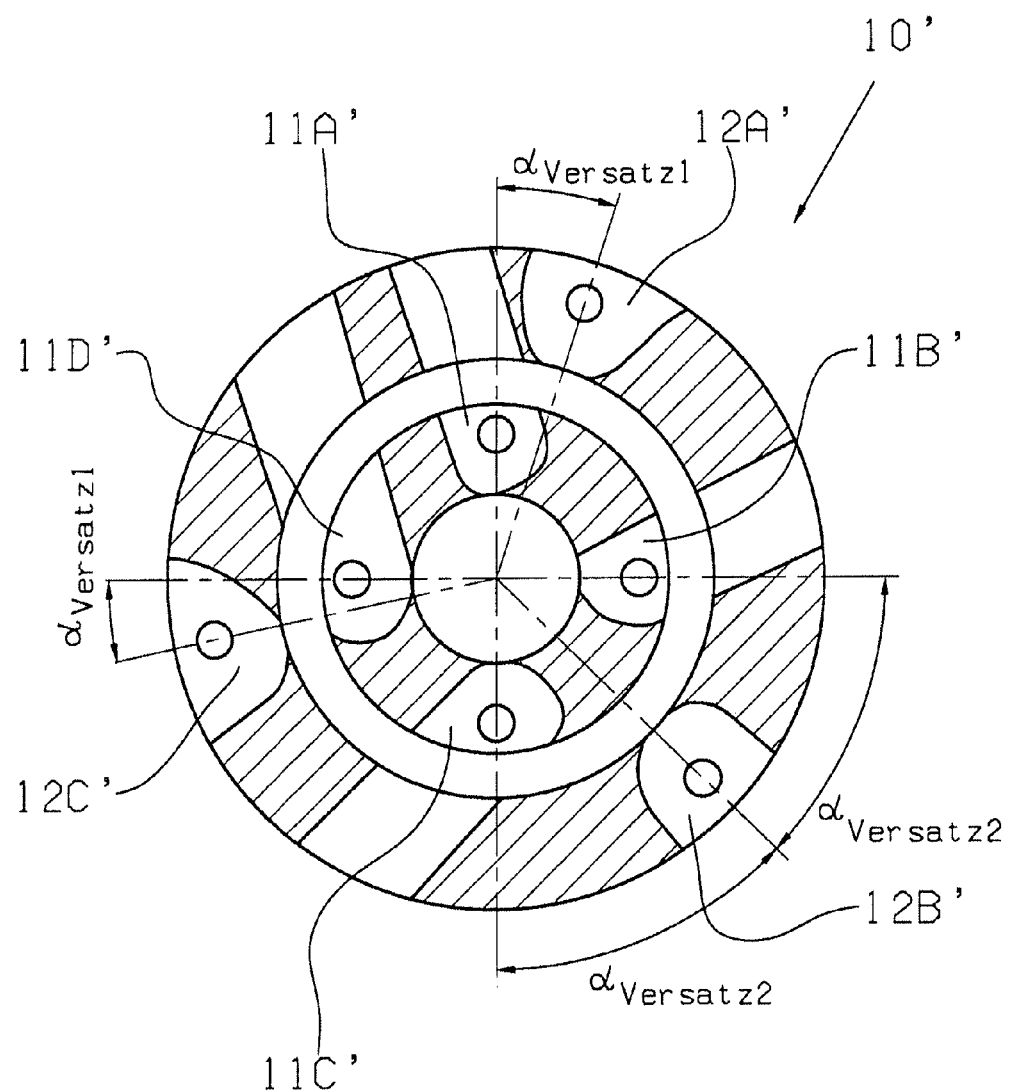
FIG. 3 a cross section of the planet carrier of a planetary gearbox according to the invention, according to a second embodiment.

FIG. 3 shows the cross section of a planet carrier 10' as a single piece of an alternative embodiment of the planetary gearbox according to the invention. In contrast to the variant described before, in this case four pockets 11A' to 11D', at the inner radial region of the planet carrier 10', are provided for four planetary gears, while in the region of the outer circumference of the planet carrier 10' as with the prior variant, there are three chambers 12A' to 12C' for accommodating three planetary gears. Due to the different numbers of planetary gears to be guided in the inner radial region and outer radial region of the planet carrier 10', different offset angles $\alpha_{Versatz1}$ and $\alpha_{Versatz2}$ are formed between each of the pockets 11A' to 11D' and 12A' to 12C'. Furthermore, all pockets 11A' to 11D' and 12A' to 12C' are demolded by means of individual radial slides.

It is possible to significantly reduce the production costs due to the shape of the planet carrier 10 or 10' of the planetary gearbox according to the invention, because the placement of the pockets 11A to 11C and 12A to 12C or 11A' to 11D' and 12A' to 12C' make it possible to completely demold using radial slides.

Reference Characters
1 first stage
2 second stage
3 sun gear
4A-4C planetary gears of the first stage
5 first ring gear
6 inner gearing
7 outer gearing
8A-8C planetary gears of the second stage
9 second ring gear
10, 10' planet carrier
11A-11C, 11A'-11D' planetary gear pockets of the first stage
12A-12C, 12A'-12C' planetary gear pockets of the second stage
13 contour of radial slide
14A-14C openings
15A-15C webs
$x_S$ axial offset
$\alpha_{Versatz}, \alpha_{Versatz1,2}$ offset angle

The invention claimed is:

1. A planetary gearbox for an automatic transmission of a motor vehicle, the planetary gearbox comprising:
first and second stages (1, 2), each stage being provided with a sun gear (3), a ring gear (5, 9) and interposed planetary gears (4A-4C, 8A-8C),
the ring gear (5) of the first planetary stage (1) also forming the sun gear of the second stage (2),
the planetary gears (4A-4C, 8A-8C) of both of the first and the second stages (1, 2) being guided by a common planet carrier (10; 10'), produced from a casting material, which accommodates the planetary gears (4A-4C) of the first stage (1) at an axial offset ($x_S$) with respect to the planetary gears (8A-8C) of the second stage (2),
the planet carrier (10; 10') being designed as one-piece such that pockets (11A-11C; 11A'-11D') are respectively disposed in the planet carrier (10; 10') for receiving the planetary gears (4A-4C) of the first stage (1) at an offset angle ($\alpha_{Versatz}$; $\alpha_{Versatz1,2}$) in a circumferential direction to pockets (12A-12C; 12A'-12C') for receiving the planetary gears (8A-8C) of the second stage (2) so that the pockets being formed during casting using slides.

2. The planetary gearbox according to claim 1, wherein the offset angle ($\alpha_{Versatz}$; $\alpha_{Versatz1,2}$) is in a range of between 20° to 70°.

3. The planetary gearbox according to claim 1, wherein each of the pockets (11A'-11D', 12A'-12C') is formed by an individual slide.

4. The planetary gearbox according to claim 1, wherein webs (15A-15C) are provided in a circumferential direction between the pockets (12A-12C) for receiving the planetary gears (8) of the second stage (2), and openings (14A-14C) for manufacturing the pockets (11A-11C) of the first stage (1).

5. The planetary gearbox according to claim 1, wherein that the first stage (1) and the second stage (2) comprise a different numbers of planetary gears (4A-4C, 8A-8C).

6. The planetary gearbox according to claim 1, wherein the planet carrier (10; 10') is a high pressure die casting.

7. An automatic transmission of a motor vehicle, the automatic transmission comprising:
   at least one planetary gearbox comprising first and second stages (1, 2), each provided with a sun gear (3), a ring gear (5, 9) and interposed planetary gears (4A-4C, 8A-8C),
   the ring gear (5) of the first planetary stage (1) also forming the sun gear of the second stage (2),
   the planetary gears (4A-4C, 8A-8C) of both of the first and the second stages (1, 2) being guided by a common planet carrier (10; 10'), produced from a casting material, and accommodating the planetary gears (4A-4C) of the first stage (1) at an axial offset ($x_S$) to the planetary gears (8A-8C) of the second stage (2),
   the planet carrier (10; 10') being designed as one-piece, such that pockets (11A-11C; 11A'-11D') are respectively disposed in the planet carrier (10; 10') for receiving the planetary gears (4A-4C) of the first stage (1) at an offset angle ($\alpha_{Versatz}$; $\alpha_{Versatz1,2}$) in a circumferential direction to the pockets (12A-12C; 12A'-12C') for receiving the planetary gears (8A-8C) of the second stage (2), and the pockets being formed during casting using slides.

8. A planetary gearbox for an automatic transmission of a motor vehicle, the planetary gearbox comprises:
   first and second stages (1, 2) and each of the first and the second stages (1, 2) comprising a sun gear (3), a ring gear (5, 9) and interposed planetary gears (4A-4C, 8A-8C),
   the ring gear (5) of the first planetary stage (1) forming the sun gear of the second stage (2),
   the planetary gears (4A-4C, 8A-8C) of the first and the second stages (1, 2) being supported by a common planet carrier (10; 10'), which is produced from a casting material as a single piece,
   the planetary gears (4A-4C) of the first stage (1) being axially offset with respect to the planetary gears (8A-8C) of the second stage (2) by an axial offset ($x_S$),
   the planet carrier (10; 10') comprising first pockets (11A-11C; 11A-11D') receiving the planetary gears (4A-4C) of the first stage (1) and second pockets (12A-12C; 12A'-12C') receiving the planetary gears (8A-8C) of the second stage (2),
   the first pockets (11A-11O; 11A'-11D') and the planetary gears (4A-4C) of the first stage (1) being offset, in a circumferential direction, with respect to the second pockets (12A-12C; 12A'-12C') and the planetary gears (8A-8C) of the second stage (2) by a circumferential offset angle ($\alpha_{Versatz}$; $\alpha_{Versatz1,2}$) such that the first and the second pockets (11A-11C; 11A'-11D', 12A-12C; 12A'-12C') being formed using slides during casting.

9. The planetary gearbox according to claim 8, wherein the circumferential offset angle ($\alpha_{Versatz}$; $\alpha_{Versatz1,2}$) is within a range of about 20° to 70°.

* * * * *